(12) United States Patent
Beer et al.

(10) Patent No.: US 6,658,841 B2
(45) Date of Patent: Dec. 9, 2003

(54) METHOD FOR CHECKING A THREE-WAY EXHAUST CATALYTIC CONVERTER OF AN INTERNAL-COMBUSTION ENGINE

(75) Inventors: Johannes Beer, Regensburg (DE); Hong Zhang, Tegernheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/042,105

(22) Filed: Jan. 7, 2002

(65) Prior Publication Data

US 2002/0144502 A1 Oct. 10, 2002

Related U.S. Application Data

(63) Continuation of application No. PCT/DE00/02085, filed on Jun. 27, 2000.

(30) Foreign Application Priority Data

Jul. 7, 1999 (DE) .......................... 199 31 321

(51) Int. Cl.⁷ ............................... F01N 3/00
(52) U.S. Cl. ..................... 60/286; 60/274; 60/277; 60/285; 60/289; 60/295; 701/107
(58) Field of Search .................. 60/274, 276, 277, 60/285, 289, 295, 286, 297; 701/107, 115

(56) References Cited

U.S. PATENT DOCUMENTS

| | | | |
|---|---|---|---|
| 5,410,873 A | * | 5/1995 | Tashiro .................. 60/276 |
| 5,426,934 A | | 6/1995 | Hunt et al. |
| 5,437,153 A | * | 8/1995 | Takeshima et al. ........... 60/276 |
| 5,452,576 A | * | 9/1995 | Hamburg et al. ............ 60/274 |
| 5,771,686 A | * | 6/1998 | Pischinger et al. ........... 60/274 |
| 6,167,695 B1 | * | 1/2001 | Itou et al. .................... 60/274 |
| 6,363,715 B1 | * | 4/2002 | Bidner et al. ................ 60/285 |

FOREIGN PATENT DOCUMENTS

| | | |
|---|---|---|
| DE | 23 28 459 | 1/1975 |
| DE | 0 498 598 B1 | 8/1992 |
| DE | 44 02 850 A1 | 8/1994 |
| DE | 692 02 163 T2 | 9/1995 |
| DE | 197 07 849 A1 | 9/1998 |
| DE | 197 14 293 C1 | 9/1998 |
| JP | 07 180 535 | 7/1995 |
| JP | 09 144 531 | 6/1997 |

OTHER PUBLICATIONS

Sideris, M.: "Methods for Monitoring and Diagnosing the Efficiency of Catalytic Converters", EPO Applied Technology Series, vol. 14, pp. 335–349 and Studies in Surface Science and Catalysis, vol. 115, pp. 338, 339, 344.

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

To check a three-way catalytic converter, a NOx sensor is used to determine the NOx concentration downstream of the catalytic converter that is to be diagnosed. On account of the close relationship between a NOx conversion and a HC conversion, the measured NOx concentration can be used to determine the HC conversion properties of the three-way catalytic converter.

8 Claims, 2 Drawing Sheets

METHOD FOR CHECKING A THREE-WAY EXHAUST CATALYTIC CONVERTER OF AN INTERNAL-COMBUSTION ENGINE

CROSS-REFERENCE TO RELATED APPLICATION

This application is a continuation of copending International Application No. PCT/DE00/02085, filed Jun. 27, 2000, which designated the United States.

BACKGROUND OF THE INVENTION

Field of the Invention

The invention relates to a method for checking a three-way exhaust catalytic converter disposed in an exhaust pope of an internal-combustion engine. The engine is operated with an air/fuel ratio that corresponds to a conversion window of the catalytic converter. The NOx concentration in the exhaust pipe downstream of the catalytic converter is recorded by a NOx sensor. The NOx concentration values are used to determine conversion properties of the catalytic converter.

To monitor exhaust catalytic converters for internal-combustion engines, methods that use the oxygen storage capacity (OSC) of the catalytic converter are known. The storage capacity correlates to the hydrocarbon conversion in the catalytic converter. If the catalytic converter has good conversion properties, the lambda fluctuations upstream of the catalytic converter, which are produced by the lambda regulator and are recorded by a first lambda sensor, are smoothed out by the oxygen storage capacity of the catalytic converter. If the conversion properties of the catalytic converter have been reduced or eliminated as a result of aging, poisoning by leaded fuel or by combustion failures, the control fluctuation on the lambda sensor which is present upstream of the catalytic converter makes its presence felt downstream of the catalytic converter. By comparing the signal amplitudes from the two lambda sensors, it is possible to work out that the catalytic converter is functioning correctly or is defective (see Published, Non-Prosecuted German Patent Application DE 23 28 459 A1).

In vehicles which are certified in accordance with the stringent ultra low emission vehicle (ULEV) or super ultra low emission vehicle (SULEV) limits, deteriorations in the conversion rates of even a few percent lead to the diagnosis limits being exceeded. However, relatively low amplitude ratios are determined at these conversion rates. Consequently, there is no longer a reliable distinction between a defective catalytic converter and a correctly functioning catalytic converter, in particular taking account of series-production scatter and the nonlinear correlation between oxygen storage capacity and HC conversion.

German Patent DE 197 14 293 C1 uses the relationship between exothermic energy conversion in the catalytic converter and HC conversion by temperature methods for diagnosing the catalytic converter. To assess the conversion properties of the catalytic converter, a temperature model is used to calculate the thermal energy generated in a reference catalytic converter which is not catalytically coated, and to compare the thermal energy with the thermal energy generated in the catalytic converter, which is measured. A measure for the conversion ability of the catalytic converter is determined from the difference, and by comparing the measure with a comparison value. From this it is determined that either the catalytic converter is defective or that the catalytic converter has sufficient conversion properties.

SUMMARY OF THE INVENTION

It is accordingly an object of the invention to provide a method for checking a three-way exhaust catalytic converter of an internal-combustion engine which overcomes the above-mentioned disadvantages of the prior art methods of this general type, which checks the conversion ability of a three-way exhaust catalytic converter which does not require expensive temperature sensors and a second lambda sensor.

With the foregoing and other objects in view there is provided, in accordance with the invention, a method for checking a conversion ability of a three-way exhaust catalytic converter disposed in an exhaust pipe of an internal-combustion engine. The internal-combustion engine is operated with an air/fuel ratio corresponding to a conversion window of the three-way exhaust catalytic converter. The method includes using an NOx sensor for recording an NOx concentration in the exhaust pipe downstream of the three-way exhaust catalytic converter; and using values of the NOx concentration to determine conversion properties of the three-way exhaust catalytic converter by performing the below listed steps while the internal-combustion engine is warming up with the air/fuel ratio. A sum value is formed of the NOx concentration measured from a beginning of a starting of the internal-combustion engine until a time at which the NOx concentration falls below a predetermined threshold. The sum value is compared with the predetermined threshold, and the three-way exhaust catalytic converter is determined to be aged if the predetermined threshold is exceeded.

The present invention is based on the idea of using a NOx sensor for determining the NOx concentration downstream of the catalytic converter to be diagnosed in order to check a three-way catalytic converter. The required condition for the diagnosis method is an air/fuel ratio $\lambda$ which is within the conversion window of the catalytic converter (typically: $0.995 \leq \lambda \leq 0.999$), since the NOx conversion falls considerably in particular at lambda values of greater than 0.999.

On account of the close relationship between the NOx conversion and the HC conversion, the measured NOx concentration can be used to work out not only the directly determined NOx conversion properties but also the HC conversion properties of a three-way catalytic converter. The relationship applies within the air/fuel ratio range described above.

The method has the advantage in particular that it also allows the diagnosis of exhaust-gas installations with three-way catalytic converters with a high degree of accuracy, even if stringent exhaust-gas limit values are to be observed.

In accordance with an added mode of the invention, there is the step of activating a malfunction indication device and/or inputting an entry into a malfunction memory if the predetermined threshold is exceeded.

In accordance with another mode of the invention, there is the step of storing the predetermined threshold in a characteristic diagram as a function of operating variables of the internal-combustion engine.

In accordance with a further mode of the invention, there is the step of using an intake air mass flow rate of the internal-combustion engine, the air/fuel ratio and/or a rotational speed of the internal-combustion engine as operating variables.

With the foregoing and other objects in view there is provided, in accordance with the invention, a method for checking a conversion ability of a three-way exhaust catalytic converter disposed in an exhaust pipe of an internal-combustion engine. The internal-combustion engine is operated with an air/fuel ratio corresponding to a conversion window of the three-way exhaust catalytic converter. The method includes using an NOx sensor for recording an NOx concentration in the exhaust pipe downstream of the three-way exhaust catalytic converter; and using the values of the NOx concentration to determine conversion properties of the three-way exhaust catalytic converter by performing the below listed steps while the internal combustion engine is warming up and secondary air is supplied. A sum value is formed from the NOx concentration measured from a time at which a supply of the secondary air is terminated until a further time at which the NOx concentration falls below a predetermined threshold. The sum value is compared with the predetermined threshold, and it is inferred the exhaust catalytic converter has aged if the predetermined threshold is exceeded.

Other features which are considered as characteristic for the invention are set forth in the appended claims.

Although the invention is illustrated and described herein as embodied in a method for checking a three-way exhaust catalytic converter of an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
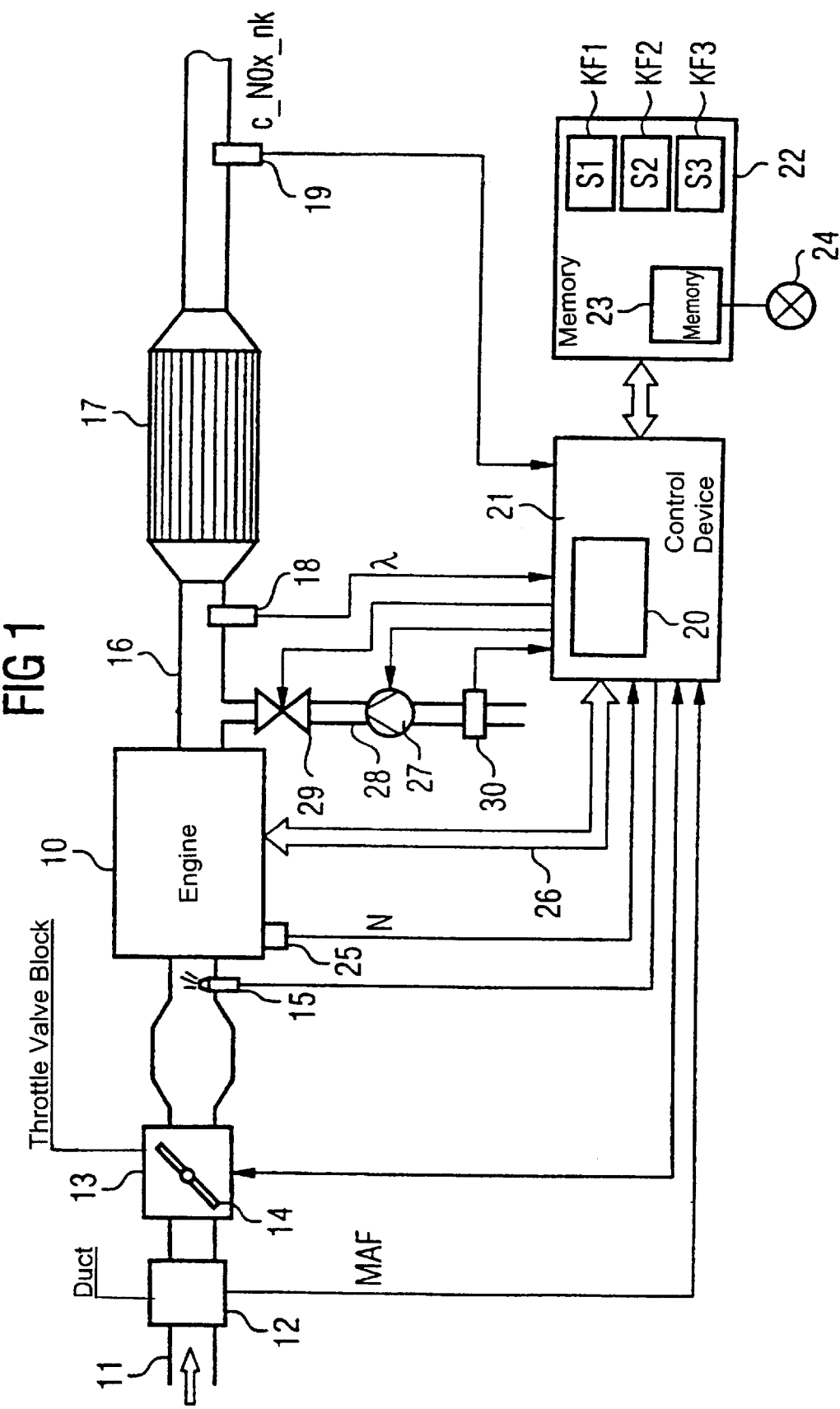
FIG. 1 is a block circuit diagram of an internal-combustion engine with associated exhaust-gas after-treatment installation according to the invention.

Referring now to the figures of the drawing in detail and first, particularly, to FIG. 1 thereof, there is shown in a highly simplified illustration, in the form of a block circuit diagram, of an internal-combustion engine 10 with an associated exhaust-gas after-treatment installation in which the method according to the invention is employed. FIG. 1 illustrates only the components that are required in order to gain an understanding of the invention. In particular, the fuel cycle has not been illustrated.

The air required for combustion is fed to the internal-combustion engine 10 via an induction duct 11. As seen in the direction of flow of induction air, a load sensor in the form of an air mass flow meter 12, a throttle valve block 13 with a throttle valve 14 and a set of injection valves 15. The number of injection valves 15 is equal to the number of cylinders, although only one of the valves 15 is shown, and are disposed in succession in the induction duct 11. However, the method according to the invention can also be used in a system which has only one injection valve for all the cylinders (central injection system, single point injection system) or in which fuel is injected directly into the respective cylinders (direct injection, high-pressure injection).

On an outlet side, the internal-combustion engine 10 is connected to an exhaust pipe 16, in which a three-way exhaust catalytic converter 17 is disposed. The simplified term exhaust catalytic converter is used below to indicate the three-way exhaust catalytic converter 17.

A sensor configuration for the exhaust-gas after-treatment includes, inter alia, an oxygen measuring pick-up, in the form of a lambda sensor 18, which is disposed upstream of the exhaust catalytic converter 17 and an NOx sensor 19 for determining a NOx concentration and for supplying a corresponding signal to a trim control downstream of the exhaust catalytic converter 17. The oxygen measuring pick-up 18 used may be either a broadband lambda sensor, which emits a continuous, e.g. linear output signal as a function of the oxygen content in the exhaust gas, or a step-change lambda sensor, the output signal of which changes suddenly in the event of a transition from a rich mix to a lean mix and vice versa. The signal from the measurement pick-up 18 is used to control the mix in accordance with the stipulated set values. The operation is performed by a lambda regulation device 20 that is known per se and is preferably integrated in a control device 21 that controls operation of the internal-combustion engine 10. Electronic control devices 21 of this type, which generally include one or more microprocessors and, in addition to the fuel injection and ignition control, are also responsible for a wide range of further control tasks, including checking the exhaust-gas after-treatment system, are known per se, and consequently the following text will only deal with their structure and method of operation insofar as they are relevant to the invention. In particular, the control device 21 is connected to a memory device 22, in which, inter alia, various characteristic diagrams or maps KF1–KF3 are stored, the meaning of which is explained in more detail with reference to the description of the FIGS. 2 and 3.

The memory device 22 also contains a malfunction memory 23 that is assigned a malfunction indication device 24. The malfunction indication device 24 is preferably configured as a malfunction indication lamp (MIL).

A rotational speed N of the internal-combustion engine 10 is recorded with the aid of a rotational-speed sensor 25. The rotational-speed signal is likewise fed to the control device 21 for further evaluation and processing, as are output signals MAF of the air mass flow meter 12 and a signal c_NOx_nk of the NOx sensor 19.

To control the internal-combustion engine 10, the control device 21 is also connected, via a data and control line 26, to further sensors and actuators, which are not specifically illustrated.

To feed secondary air into the exhaust pipe 16 upstream of the exhaust catalytic converter 17, there is a secondary air system which is known per se and has a secondary air pump 27, a secondary air feed line 28, a secondary air valve 29 and a secondary air mass flow meter 30. The secondary air pump 27 and the secondary air valve 29 are connected to the control device 21 via actuation lines. The secondary air mass flow meter 30 transmits a signal, which corresponds to the air mass flow rate delivered by the secondary air pump 27, to the control device 21.

Figure 2:
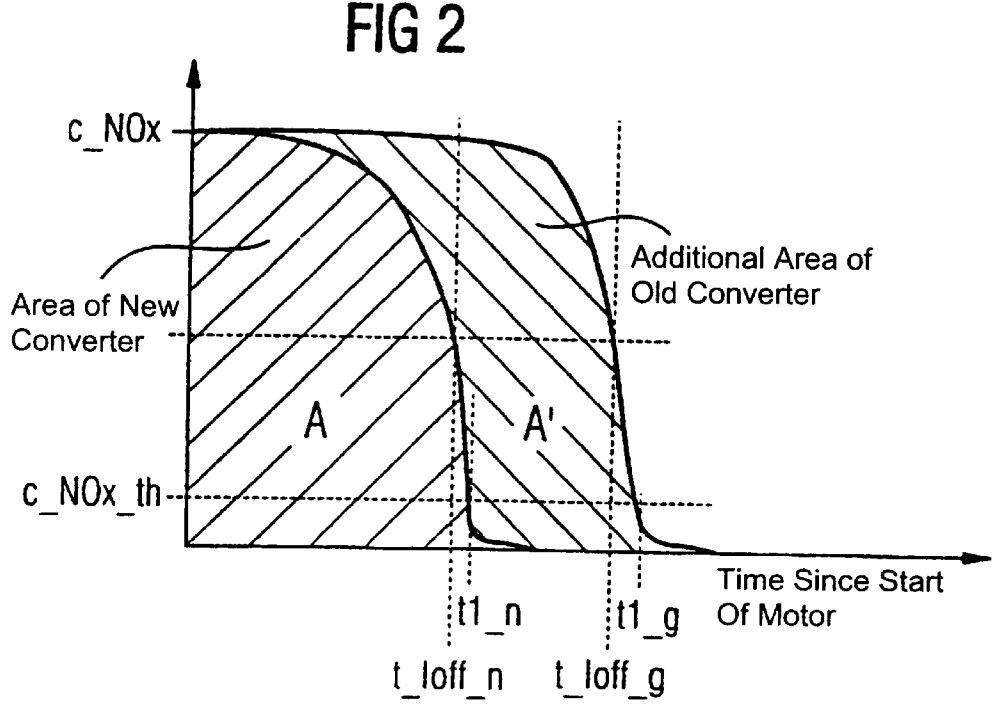
FIG. 2 is a graph illustrating a profile of an NOx concentration over a course of time downstream of an exhaust catalytic converter while the internal-combustion engine is warming up.

FIG. 2 shows the relationship between the NOx concentration downstream of the exhaust catalytic converter and a time t while the internal-combustion engine is warming up, with an air/fuel ratio which lies within or slightly below the given conversion window for a new and an aged exhaust catalytic converter. In FIG. 2, the time t after the internal-combustion engine 10 has been started is plotted on the abscissa, and the concentration c_NOx is plotted on the ordinate, the concentration being recorded by the NOx sensor 19 (FIG. 1).

When the exhaust catalytic converter reaches the light-off temperature, which is defined as the temperature at which 50% of the NOx emissions are converted, typically 250° C.–300° C. in conventional exhaust catalytic converters, the measured NOx concentration downstream of the exhaust catalytic converter drops considerably. Depending on the aging of the exhaust catalytic converter, the onset of NOx conversion is delayed if the exhaust catalytic converter is aged. This effect is used for diagnostic purposes. The light-off time for a new exhaust catalytic converter is shown on the abscissa as t_loff_n, and the light-off time for an aged exhaust catalytic converter is shown on the abscissa as t_loff_g.

The hatched area of the NOx concentration downstream of the exhaust catalytic converter is delimited by the time ti at which the NOx concentration falls below a predetermined threshold c_NOx_th. This area is a measure of the NOx conversion property of the exhaust catalytic converter.

According to the illustration shown in FIG. 2, the integration value for an aged exhaust catalytic converter will be greater by an additional area A', on account of the delayed light-off, than for an as-new exhaust catalytic converter (area A). The NOx concentration only falls below the threshold c_NOx_th at time t1_g, while for a new or as-new exhaust catalytic converter it falls below the threshold as early as at time t_n.

For a new exhaust catalytic converter, the following relationship applies:

$$S_1(\lambda, N, MAF) > \int_0^{t_1} c_{NOx}(t)\, dt \quad (1)$$

where $t_1 = \min\{t / c_{NOx}(t) < c_{NOx\_th}\}$

When the threshold S1, which is readout by a characteristic diagram KF1 which has been empirically determined and/or recorded by driving tests, as a function of the operating variables air/fuel ratio $\lambda$, rotational speed N and intake air mass flow rate MAF, is exceeded, the malfunction indication device 24 is activated. In parallel, the fact that the threshold S1 has been exceeded can be entered into the malfunction memory 23, which can be readout during the next visit to a repair shop such as a dealership.

Figure 3:
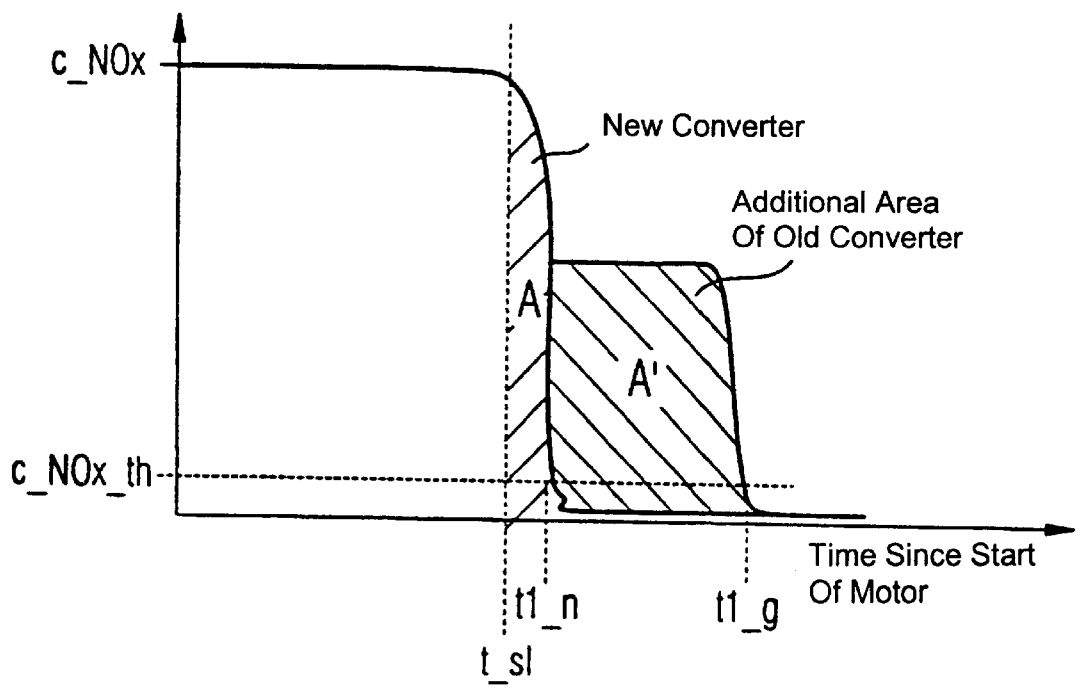
FIG. 3 is a graph illustrating the profile of the NOx concentration over the course of time downstream of the exhaust catalytic converter when secondary air is being supplied while the internal-combustion engine is warming up.

FIG. 3 shows the relationship between the NOx concentration downstream of the exhaust catalytic converter and the time, with secondary air being supplied while the internal-combustion engine is warming up, for a new exhaust catalytic converter and an aged exhaust catalytic converter.

To accelerate the light-off of the exhaust catalytic converter 17, secondary air is blown into the rich combustion exhaust gas, which leads to accelerated oxidation of the exhaust-gas constituents. The procedure leads to a lean exhaust-gas composition.

If the secondary air system is activated, i.e. the secondary air pump 27 is switched on and the secondary air valve 29 (FIG. 1) is open, it is impossible to carry out any diagnosis in the lean exhaust gas, on account of the absence of NOx conversion by the exhaust catalytic converter.

If the time t_sL within which the secondary air system is activated is such that it is identical to the light-off time t_loff_n of a new exhaust catalytic converter, the conversion can be derived from the drop in the NOx concentration. After the time t_sl has elapsed, the lambda control establishes an exhaust-gas composition that is within the catalytic converter conversion window and consequently under which good conditions for NOx conversion prevail.

The hatched area of the NOx concentration downstream of the exhaust catalytic converter is delimited by the time t1 at which the NOx concentration falls below a predetermined threshold c_NOx_th. This area is a measure of the NOx conversion property of the exhaust catalytic converter.

Even in an aged exhaust catalytic converter, the NOx concentration changes when the secondary air system is switched off, since after the heating measure by blowing secondary air into the exhaust pipe has ended, the engine combustion lambda value also changes.

According to the illustration shown in FIG. 3, the integration value for an aged exhaust catalytic converter will, on account of the delayed light off, be larger by the additional area A' than for a new or as-new exhaust catalytic converter (area A). The NOx concentration only falls below the threshold c_NOx_th at time t1_g, while in a new or as-new exhaust catalytic converter it falls below this threshold as early as at time t1_n.

For a new exhaust catalytic converter, the following relationship applies:

$$S_2(\lambda, N, MAF) > \int_{t_{SL}}^{t_1} c_{NOx}(t)\, dt \quad (2)$$

where $t_1 = \min\{t / c_{NOx}(t) < c_{NOx\_th}\}$

When the threshold value S2, which is readout by the characteristic diagram KF2 which has been empirically determined and/or recorded by driving tests, as a function of the operating variables air/fuel ratio $\lambda$, rotational speed N and intake air mass flowrate MAF, is exceeded, the malfunction indication device 24 is activated. In parallel, the fact that the threshold value S1 has been exceeded can be entered into a malfunction memory 23, which can be readout during the next visit to the repair shop.

As well as the ways of diagnosing the conversion ability of the exhaust catalytic converter while the internal-combustion engine is warming up which have been described above, it is also possible to carry out the diagnosis of the exhaust catalytic converter while the internal-combustion engine is at its operating temperature.

If the lambda control is active (0.995≦$\lambda$≦0.999), diagnosis can also be carried out in steady operating states of the internal-combustion engine. To increase the reliability of diagnosis, the measured NOx concentration is integrated over a predetermined time t_Stat and is compared with a threshold S3, which is once again dependent on operating variables via a characteristic diagram KF3.

$$S_3(\lambda, N, MAF) > \int_{t_{Start}}^{t_{Start}+t_{Stat}} c_{NOx}(t)\, dt \quad (3)$$

The integration value for an aged catalytic converter is greater than for an as-new exhaust catalytic converter, on account of the reduced conversion. When the threshold S3, which is readout by the characteristic diagram KF3, which has been empirically determined and/or recorded by driving tests, as a function of the operating variables air/fuel ratio $\lambda$ rotational speed N and intake air mass flow rate MAF, is exceeded, the malfunction indication device 24 is activated. In parallel, the fact that the threshold value S1 has been exceeded can be input into a malfunction memory 23, which can be read out during the vehicle's next visit to the workshop.

We claim:

1. A method for checking a conversion ability of a three-way exhaust catalytic converter disposed in an exhaust pipe of an internal-combustion engine, the internal-combustion engine being operated with an air/fuel ratio corresponding to a conversion window of the three-way exhaust catalytic converter, which comprises the steps of:

using an NOx sensor for recording an NOx concentration in the exhaust pipe downstream of the three-way exhaust catalytic converter; and using values of the NOx concentration to determine conversion properties of the three-way exhaust catalytic converter by performing the following steps while the internal-combustion engine is warming up with the air/fuel ratio:

forming a sum value of the NOx concentration measured from a beginning of a starting of the internal-combustion engine until a time at which the NOx concentration falls below a predetermined threshold;

comparing the sum value with the predetermined threshold;

inferring that the three-way exhaust catalytic converter has aged if the predetermined threshold is exceeded; and performing at least one of activating a malfunction indication device and inputting an entry into a malfunction memory if the predetermined threshold is exceeded.

2. The method according to claim 1, which comprises storing the predetermined threshold in a characteristic diagram as a function of operating variables of the internal-combustion engine.

3. The method according to claim 2, which comprises using at least one of an intake air mass flow rate of the internal-combustion engine, the air/fuel ratio and a rotational speed of the internal-combustion engine as operating variables.

4. The method according to claim 1, wherein the air/fuel ratio is 1.

5. A method for checking a conversion ability of a three-way exhaust catalytic converter disposed in an exhaust pipe of an internal-combustion engine, the internal-combustion engine being operated with an air/fuel ratio corresponding to a conversion window of the three-way exhaust catalytic converter, which comprises the steps of:

using an NOx sensor for recording an NOx concentration in the exhaust pipe downstream of the three-way exhaust catalytic converter; and using the values of the NOx concentration to determine conversion properties of the three-way exhaust catalytic converter by performing the following steps while the internal combustion engine is warming up and secondary air is being supplied:

forming a sum value from the NOx concentration measured from a time at which a supply of the secondary air is terminated until a further time at which the NOx concentration falls below a predetermined threshold;

comparing the sum value with the predetermined threshold;

inferring that the exhaust catalytic converter has aged if the predetermined threshold is exceeded; and performing at least one of activating a malfunction indication device and inputting an entry into a malfunction memory if the predetermined threshold is exceeded.

6. The method according to claim 5, which comprises storing the predetermined threshold in a characteristic diagram as a function of operating variables of the internal-combustion engine.

7. The method according to claim 6, which comprises using at least one of an intake air mass flow rate of the internal-combustion engine, the air/fuel ratio and a rotational speed of the internal-combustion engine as operating variables.

8. The method according to claim 5, which further comprises warming up the internal combustion engine with the air/fuel ratio of 1.

* * * * *